(12) United States Patent
Botros et al.

(10) Patent No.: US 9,321,945 B2
(45) Date of Patent: Apr. 26, 2016

(54) SYSTEMS, METHODS AND COMPOSITIONS FOR PRODUCTION OF TIE-LAYER ADHESIVES

(75) Inventors: Maged G. Botros, Liberty Township, OH (US); Jeffrey C. Haley, Norwood, OH (US)

(73) Assignee: Equistar Chemicals, LP, Houston, TX (US)

( * ) Notice: Subject to any disclaimer, the term of this patent is extended or adjusted under 35 U.S.C. 154(b) by 235 days.

(21) Appl. No.: 13/250,323

(22) Filed: Sep. 30, 2011

(65) Prior Publication Data

US 2013/0085221 A1   Apr. 4, 2013

(51) Int. Cl.
*C08F 222/06* (2006.01)
*C09J 151/06* (2006.01)
*C08F 255/02* (2006.01)
*C09J 123/08* (2006.01)
*C08F 4/6592* (2006.01)
*C08F 4/659* (2006.01)

(52) U.S. Cl.
CPC ............. *C09J 151/06* (2013.01); *C08F 255/02* (2013.01); *C09J 123/08* (2013.01); *C08F 4/65912* (2013.01); *C08F 4/65916* (2013.01); *C08F 4/65925* (2013.01)

(58) Field of Classification Search
CPC ...... C08F 222/06; C08F 4/7042; C08L 51/06; C09J 123/04
See application file for complete search history.

(56) References Cited

U.S. PATENT DOCUMENTS

| | | | |
|---|---|---|---|
| 6,166,142 A | 12/2000 | Zhang et al. | |
| 6,299,985 B1 | 10/2001 | Zhang et al. | |
| 6,645,588 B1 | 11/2003 | Leiden et al. | |
| 7,198,852 B1 | 4/2007 | Vogt et al. | |
| 7,767,613 B2 | 8/2010 | Mihan et al. | |
| 7,928,051 B2 | 4/2011 | Kipke et al. | |
| 8,008,403 B2 | 8/2011 | Kipke et al. | |
| 8,222,356 B2 | 7/2012 | Kipke et al. | |
| 2007/0213205 A1 | 9/2007 | Mihan | |
| 2007/0255033 A1 | 11/2007 | Kipke et al. | |
| 2008/0057244 A1* | 3/2008 | Bushelman et al. | 428/35.7 |
| 2008/0163978 A1 | 7/2008 | Botros et al. | |
| 2008/0196922 A1 | 8/2008 | Van Marion et al. | |
| 2008/0286509 A1 | 11/2008 | Kipke et al. | |
| 2010/0098935 A1 | 4/2010 | McGee et al. | |
| 2010/0152383 A1* | 6/2010 | Jiang et al. | 525/53 |
| 2010/0174036 A1 | 7/2010 | Lee et al. | |
| 2010/0298500 A1 | 11/2010 | Lee et al. | |
| 2010/0311925 A1 | 12/2010 | Mihan et al. | |
| 2011/0027583 A1 | 2/2011 | Lee et al. | |
| 2011/0045295 A1 | 2/2011 | Vogt et al. | |
| 2011/0281722 A1 | 11/2011 | Kipke et al. | |

FOREIGN PATENT DOCUMENTS

| | | | | |
|---|---|---|---|---|
| EP | 1316598 A1 | 6/2003 | | |
| EP | 1739691 A1 | 1/2007 | | |
| GB | 2081723 A | 2/1982 | | |
| WO | WO-9703139 A1 | 1/1997 | | |
| WO | WO-9937730 A1 | 7/1999 | | |
| WO | WO-2005103095 A1 | 11/2005 | | |
| WO | WO-2008054637 A1 | 5/2008 | | |
| WO | WO 2009103516 A2 * | 8/2009 | ............. C09J 151/06 | |

OTHER PUBLICATIONS

Handbook of Polyethylene, 2000.*
PCT International Search Report and the Written Opinion—Mailed Oct. 1, 2013 for Corresponding PCT/US2012/058236.

* cited by examiner

*Primary Examiner* — Mark Kaucher

(57) ABSTRACT

A tie layer adhesive composition for multilayer structures, wherein the tie layer is composed of a graft polyolefin and a hybrid polyolefin.

7 Claims, 1 Drawing Sheet

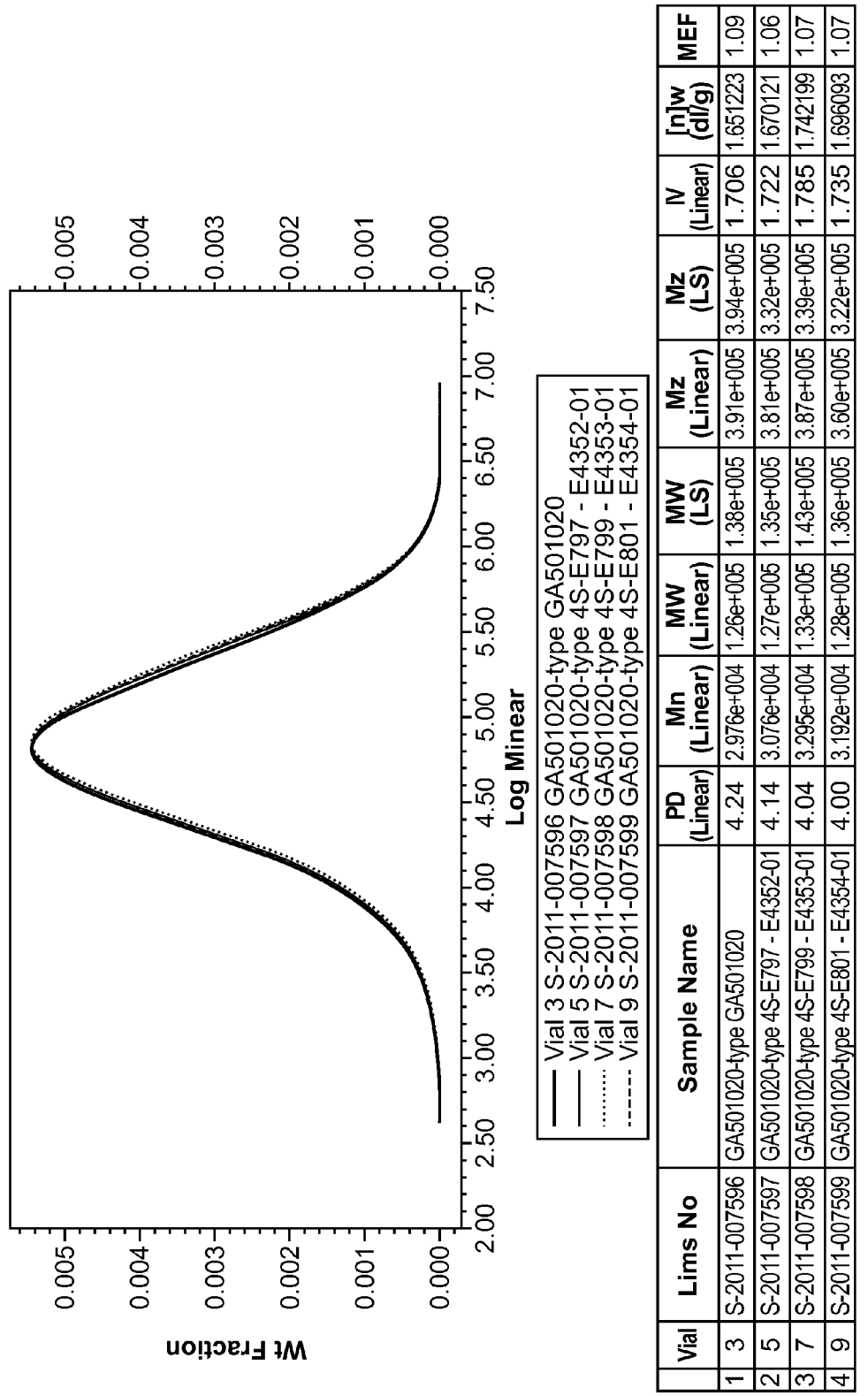

SYSTEMS, METHODS AND COMPOSITIONS FOR PRODUCTION OF TIE-LAYER ADHESIVES

FIELD OF TECHNOLOGY

The present application is directed to systems, methods and compositions for the production of tie-layer adhesives. In particular, the present application is directed to tie layers comprised of graft polyolefin and a hybrid polyolefin for use with multilayer structures.

BACKGROUND

Tie-layer adhesives are used to bond polyolefins to dissimilar substrates in multilayer, co-extruded structures, particularly for blown and cast film, extrusion coating, blow molding, sheet extrusion, wire & cable, pipe, and other industrial applications. The tie-layer adhesive typically comprises a polyolefin base resin, which is the predominant component, and a grafted polyolefin. The grafted polyolefin is produced by reacting a polyolefin with an unsaturated monomer at elevated temperatures with or without a free-radical initiator. Commercially available tie-layer adhesives include Plexar® resins, product of Equistar Chemicals, LP, which are anhydride-modified polyolefins.

Polyethylene (PE) resin layers are often included in multilayer structures having tie-layer adhesives. Liner low density polyethylene (LLDPE) is one of the most widely used polyolefin base resin. Ethylene-vinyl alcohol (EVOH) copolymers and polyamides are also widely used as oxygen barrier layers in polymeric multi-layer structures used in food packaging applications.

Grafted polyolefins are also known to be used in tie layers. For example, U.S. Pat. Appl. Publ. No. 2010/0174036 teaches that tie-layer adhesives useful for multilayer films having a favorable balance of clarity and adhesion can be made by blending, in sequence, a grafted ("maleated") polyolefin, a polyolefin elastomer, and LLDPE.

Also known are polyolefins made from hybrid catalysts. For example, WO 2009/103516 discloses the preparation of polyethylene homopolymers and copolymers using two different single site polymerization catalysts, one of which A) is a metallocene polymerization catalyst and of which B) is a catalyst based on a transition metal complex.

A wide variety of formulations have been used to make tie-layer adhesives. The present application is directed to improved systems, methods and compositions for production of tie-layer adhesives.

SUMMARY

Improved systems, methods and compositions for production of tie-layer adhesives are herein disclosed. According to one embodiment, an adhesive composition is provided. The adhesive composition includes a graft polyolefin and a hybrid polyolefin.

The foregoing and other objects, features and advantages of the present disclosure will become more readily apparent from the following detailed description of exemplary embodiments as disclosed herein.

BRIEF DESCRIPTION OF THE DRAWINGS

FIG. 1 illustrates the molecular weight distribution of GA501-020 LLDPE.

DETAILED DESCRIPTION

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, methods, procedures and components have not been described in detail so as not to obscure the embodiments described herein.

Improved systems, methods and compositions for production of tie-layer adhesives are herein disclosed. An exemplary tie-layer adhesive composition can include a hybrid polyolefin produced with the use of a hybrid catalyst and a graft polyolefin containing one or more functional groups grafted thereon.

The tie-layer adhesive compositions herein disclosed are used to bond dissimilar materials in multilayer constructions, particularly films, sheets, pipes and other products. In particular, the adhesives are useful for bonding plastic, wood, glass, paper, composite, and metal substrates. They can be used in lamination, extrusion (or coextrusion), sheet extrusion, extrusion coating, injection molding, blow molding, melt thermoforming, and other processes.

The adhesive compositions herein disclosed are particularly valuable for making multilayer films and sheets, including barrier films. The multilayer films have at least two layers in addition to the adhesive layer, which bonds the other layers together. Usually, at least one layer serves as a barrier layer. Multilayer barrier films are widely used for food packaging, and in most of these applications, clarity and high adhesion are important. Food packaging applications include formed bags, pouches, casing for packaging meat and poultry products, snack foods, cereals, baking mixes, and the like.

I. Synthesis of Hybrid Catalysts and Polyolefins

Polyolefins that can be produced with the use of hybrid catalysts disclosed herein can be referred to as "hybrid polyolefins." The hybrid polyolefin can be a polyethylene (PE) produced with the use of a single-site hybrid catalyst or combination of catalysts. The PE can be produced in a single stage or multi stage polymerization process. The hybrid catalysts and the polyolefins produced in accordance with the present disclosure are discussed in WO 2009/103516 which is incorporated by reference herein in its entirety.

A. Hybrid Catalysts for Polymerization of Polyethylene

The hybrid catalyst systems used for polymerization of polyethylene can include metallocene-based catalysts and transition-metal based catalysts.

A particular class of single-site catalysts suitable for polymerization of hybrid olefins such as PE have a composition of at least two different single-site polymerization catalysts (A) and (B), where (A) is at least one metallocene-based catalyst, and where (B) is at least one transition metal-based catalyst, preferably an iron-based organometallic catalyst.

Hybrid Catalyst Component (A)

Hybrid catalyst component (A) can include hafnocene-based catalyst components and cyclopentadienyl complexes. The cyclopentadienyl complexes can include bridged or unbridged biscyclopentadienyl complexes as described, for example, in EP 129368, EP 561479, EP 545304 and EP 576970, monocyclopentadienyl complexes such as bridged amidocyclopentadienyl complexes described, for example, in EP 416815, multinuclear cyclopentadienyl complexes as described in EP 632063, pi-ligand-substituted tetrahydropentalenes as described in EP 659758 or pi-ligand-substituted tetrahydroindenes as described in EP 661300.

Suitable compositions for hybrid catalyst component (A) are hafnium complexes having the general formula (I):

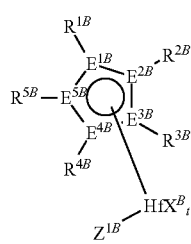 (I)

Wherein:

The $X^B$ group is one or compounds selected from the group consisting of: fluorine, chlorine, bromine, iodine, hydrogen, $C_1$-$C_{10}$-alkyl, $C_2$-$C_{10}$-alkenyl, $C_6$-$C_{15}$-aryl and alkylaryl having from 1 to 10 carbon atoms in the alkyl part and from 6 to 20 carbon atoms in the aryl part, —$OR^{6B}$ or —$NR^{6B}R^{7B}$. Two identical or different radicals $X^B$ can also be optionally joined to form a substituted or unsubstituted diene ligand, such as a 1,3-diene ligand.

The $E^{1B}$-$E^{5B}$ groups are each carbon, phosphorus or nitrogen with not more than one of $E^{1B}$-$E^{5B}$ being phosphorus or nitrogen.

The t group is the integer 1, 2 or 3 depending on the valence of Hf.

The $R^{6B}$ and $R^{7B}$ groups are each compounds selected from the group consisting of: $C_1$-$C_{10}$-alkyl, $C_6$-$C_{15}$-aryl, alkylaryl, arylalkyl, fluoroalkyl or fluoroaryl compounds each having from 1 to 10 carbon atoms in the alkyl part and from 6 to 20 carbon atoms in the aryl part.

The $R^{1B}$ to $R^{5B}$ groups are each identical or different compounds selected from the group consisting of: hydrogen, $C_1$-$C_{22}$-alkyl, 5 to 7 membered cycloalkyl or cycloalkenyl compounds optionally bearing on or more constituents selected from the group consisting of: $C_1$-$C_{10}$-alkyls, $C_2$-$C_{22}$-alkenyls, $C_6$-$C_{22}$-aryls, arylalkyls having from 1 to 16 carbon atoms in the alkyl part and from 6 to 21 carbon atoms in the aryl part, $NR^{8B}{}_2$, $N(SiR^{8B}{}_3)_2$, $OR^{8B}$, $OSiR^{8B}{}_3$, $SiR^{8B}{}_3$ compounds, where the organic radicals $R^{1B}$-$R^{5D}$ can also be substituted by halogens and/or two radicals $R^{1B}$-$R^{5B}$, in particular vicinal radicals, can also be joined to form a five, six or seven membered ring, and/or two vicinal radicals $R^{1D}$-$R^{5D}$ can be joined to form a five, six or seven membered heterocycle compound containing at least one atom from the group consisting of N, P, O and S. The radicals $R^{8B}$ can be identical or different compounds selected from the group consisting of: $C_1$-$C_{10}$-alkyl, $C_3$-$C_{10}$-cycloalkyl, $C_6$-$C_{15}$-aryl, $C_1$-$C_4$-alkoxy and $C_6$-$C_{10}$-aryloxy compounds.

The group $Z^{1B}$ is $X^B$ or

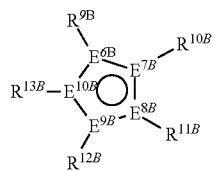

Wherein:

The $R^{9B}$ to $R^{13B}$ groups are identical or different compounds selected from the group consisting of: hydrogen, $C_1$-$C_{22}$-alkyl, 5 to 7 membered cycloalkyl or cycloalkenyl compounds optionally bearing one or more substituents selected from the group consisting of: $C_1$-$C_{10}$-alkyls, $C_2$-$C_{22}$-alkenyls, $C_6$-$C_{22}$-aryls and arylalkyls having from 1 to 16 carbon atoms in the alkyl part and 6-21 carbon atoms in the aryl part, $NR^{14B}{}_2$, $N(SiR^{14B}{}_3)_2$, $OR^{14B}$, $OSiR^{14B}{}_3$, $SiR^{14B}{}_3$, where the organic radicals $R^{9B}$-$R^{13B}$ can be substituted by halogens and/or two radicals $R^{9B}$-$R^{13B}$, in particular vicinal radicals, or can be joined to form a five, six or seven membered ring, and/or two vicinal radicals $R^{9B}$-$R^{13B}$ can be joined to form a five, six or seven membered heterocycle compound containing at least one atom from the group consisting of N, P, O and S. The $R^{14B}$ are radicals identical or different compounds selected from the group consisting of: $C_1$-$C_{10}$-alkyl, $C_3$-$C_{10}$-cycloalkyl, $C_6$-$C_{15}$-aryl, $C_1$-$C_4$-alkoxy or $C_6$-$C_{10}$-aryloxy compounds.

The $E^{6B}$-$E^{10B}$ groups are each selected from the group consisting of carbon, phosphorus and nitrogen with not more than one $E^{6B}$-$E^{10B}$ being phosphorus or nitrogen.

The $R^{4B}$ and $Z^{1B}$ groups in hybrid catalyst component (A) having the general formula (I) together form an —$R^{15B}{}_y$-$A^{1B}$- group, where $R^{15B}$ is

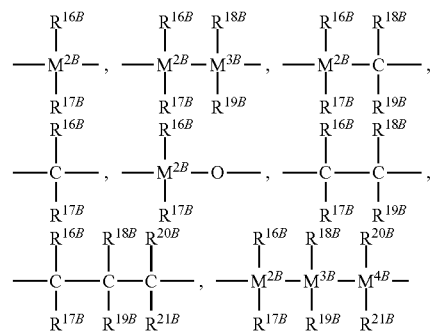

=$BR^{16B}$, =$BNR^{16B}R^{17B}$, =$AlR1^{6B}$, —Ge—, —Sn—, —O—, —S—, =SO, =$SO_2$, =$NR^{16B}$, =CO, =$PR^{16B}$ or =$P(O)R^{16B}$,

Wherein:

The $R^{16B}$-$R^{21B}$ groups are identical or different compounds selected from the group consisting of: hydrogen, halogen, trimethylsilyl, $C_1$-$C_{10}$-alkyl, $C_1$-$C_{10}$-fluoroalkyl, $C_6$-$C_{10}$-fluoroaryl, $C_6$-$C_{10}$-aryl, $C_1$-$C_{10}$-alkoxy, $C_7$-$C_{15}$-alkylaryloxy, $C_2$-$C_{10}$-alkenyl, $C_7$-$C_{40}$-arylalkyl, $C_8$-$C_{40}$-arylalkenyl and $C_7$-$C_{40}$-alkylaryl compounds or two adjacent $R^{16B}$-$R^{21B}$ groups together with the atoms connecting them form a saturated or unsaturated ring having from 4 to 15 carbon atoms.

The $M^{2B}$-$M^{4B}$ groups are compounds selected from the groups consisting of: silicon, germanium and tin.

The $A^{1B}$ group is a compound selected from the group consisting of: —O—, —S—, $PR^{22B}$, =O, =S, =$NR^{22B}$, —O—, $NR^{22B}{}_2$, $PR^{22B}{}_2$,

or an unsubstituted, substituted or fused heterocyclic ring system, where the radicals $R^{22B}$ are identical or different compounds selected from the group consisting of: $C_1$-$C_{10}$-alkyl, $C_6$-$C_{15}$-aryl, $C_3$-$C_{10}$-cycloalkyl, $C_7$-$C_{18}$-alkylaryl or $Si(R^{23B})_3$ compounds.

The $R^{23B}$ group is a compound selected from the group consisting of: hydrogen, $C_1$-$C_{10}$-alkyl, $C_6$-$C_{15}$-aryl compounds optionally bearing $C_1$-$C_4$-alkyl or $C_3$-$C_{10}$-cycloalkyl substituents.

The v group is the integer 1 or when $A^{1B}$ is an unsubstituted, substituted or fused, heterocyclic ring system the v group can also be 0.

The radicals $R^{4B}$ and $R^{12B}$ can also together form an —$R^{15B}$- group.

$A^{1B}$ can also together with the bridge $R^{15B}$, form an amine, ether, thioether or phosphine. However, $A^{1B}$ can also be an unsubstituted, substituted or fused, heterocyclic aromatic ring system which can contain heteroatoms from the group consisting of: oxygen, sulfur, nitrogen and phosphorus in addition to ring carbons. Examples of 5-membered heteroaryl groups which can contain from one to four nitrogen atoms and/or a sulfur or oxygen atom as ring members in addition to carbon atoms are 2-furyl, 2-thienyl, 2-pyrrolyl, 3-isoxazolyl, 5-isoxazolyl, 3-isothiazolyl, 5-isothiazolyl, 1-pyrazolyl, 3-pyrazolyl, 5-pyrazolyl, 2-oxazolyl, 4-oxazolyl, 5-oxazolyl, 2-thiazolyl, 4-thiazolyl, 5-thiazolyl, 2-imidazolyl, 4-imidazolyl, 5-imidazolyl, 1,2,4-oxadiazol-3-yl, 1,2,4-oxadiazol-5-yl, 1,3,4-oxadiazol-2-yl and 1,2,4-triazol-3-yl. Examples of 6-membered heteroaryl groups which can contain from one to four nitrogen atoms and/or a phosphorus atom are 2-pyridinyl, 2-phosphabenzenyl, 3-pyridazinyl, 2-pyrimidinyl, 4-pyrimidinyl, 2-pyrazinyl, 1,3,5-triazin-2-yl and 1,2,4-triazin-3-yl, 1,2,4-triazin-5-yl and 1,2,4-triazin-6-yl. The 5-membered and 6-membered heteroaryl groups may also be substituted by $C_1$-$C_{10}$-alkyl, $C_6$-$C_{10}$-aryl, alkylaryl having from 1 to 10 carbon atoms in the alkyl part and 6-10 carbon atoms in the aryl part, trialkylsilyl or halogens such as fluorine, chlorine or bromine or be fused with one or more aromatics or heteroaromatics. Examples of benzo-fused 5-membered heteroaryl groups are 2-indolyl, 7-indolyl, 2-coumaronyl, 7-coumaronyl, 2-thionaphthenyl, 7-thionaphthenyl, 3-indazolyl, 7-indazolyl, 2-benzimidazolyl and 7-benzimidazolyl. Examples of benzo-fused 6-membered heteroaryl groups are 2-quinolyl, 8-quinolyl, 3-cinnolyl, 8-cinnolyl, 1-phthalazyl, 2-quinazolyl, 4-quinazolyl, 8-quinazolyl, 5-quinoxalyl, 4-acridyl, 1-phenanthridyl and 1-phenazyl. Naming and numbering of the heterocycles has been taken from L. Fieser and M. Fieser, Lehrbuch der organischen Chemie, 3rd revised edition, Verlag Chemie, Weinheim 1957.

The radicals $X^B$ in the general formula (I) are preferably identical, and preferably are selected from fluorine, chlorine, bromine, $C_1$-$C_7$-alkyl or aralkyl, in particular chlorine, methyl or benzyl.

The synthesis of such complexes can be carried out by methods known per se, with the reaction of the appropriately substituted cyclic hydrocarbon anions with halides of hafnium being preferred. Examples of appropriate preparative methods are described, for example, in Journal of Organometallic Chemistry, 369 (1989), 359-370.

The hafnocenes can be used in the Rac or pseudo-Rac form. The term pseudo-Rac refers to complexes in which the two cyclopentadienyl ligands are in the Rac arrangement relative to one another when all other substituents of the complex are disregarded. Typical hafnocenes (A) include methylenebis(cyclopentadienyl)hafnium dichloride, methylenebis(3-methylcyclopentadienyl)hafnium dichloride, methylenebis(3-n-butylcyclopentadienyl)hafnium dichloride, methylenebis(indenyl)hafnium dichloride, methylenebis(tetrahydroindenyl)hafnium dichloride, isopropylidenebis(cyclopentadienyl)hafnium dichloride, isopropylidenebis(3-trimethylsilylcyclopentadienyl)hafnium dichloride, isopropylidenebis(3-methylcyclopentadienyl)hafnium dichloride, isopropylidenebis(3-n-butylcyclopentadienyl)hafnium dichloride, isopropylidenebis(3-phenylcyclopentadienyl)hafnium dichloride, isopropylidenebis(indenyl)hafnium dichloride, isopropylidenebis(tetrahydroindenyl)hafnium dichloride, dimethylsilanediylbis(cyclopentadienyl)hafnium dichloride, dimethylsilanediylbis(indenyl)hafnium dichloride, dimethylsilanediylbis(tetrahydroindenyl)hafnium dichloride, ethylenebis(cyclopentadienyl)hafnium dichloride, ethylenebis(indenyl)hafnium dichloride, ethylenebis(tetrahydroindenyl)hafnium dichloride, tetramethylethylene-9-fluorenylcyclopentadienylhafnium dichloride, dimethylsilanediylbis(tetramethylcyclopentadienyl)hafnium dichloride, dimethylsilanediylbis(3-trimethylsilylcyclopentadienyl)hafnium dichloride, dimethylsilanediylbis(3-methylcyclopentadienyl)hafnium dichloride, dimethylsilanediylbis(3-n-butylcyclopentadienyl)hafnium dichloride, dimethylsilanediylbis(3-tert-butyl-5-methylcyclopentadienyl)hafnium dichloride, dimethylsilanediylbis(3-tert-butyl-5-ethylcyclopentadienyl)hafnium dichloride, dimethylsilanediylbis(2-methylindenyl)hafnium dichloride, dimethylsilanediylbis(2-isopropylindenyl)hafnium dichloride, dimethylsilanediylbis(2-tert-butylindenyl)hafnium dichloride, diethylsilanediylbis(2-methylindenyl)hafnium dibromide, dimethylsilanediylbis(3-methyl-5-methylcyclopentadienyl)hafnium dichloride, dimethylsilanediylbis(3-ethyl-5-isopropylcyclopentadienyl)hafnium dichloride, dimethylsilanediylbis(2-ethylindenyl)hafnium dichloride, dimethylsilanediylbis(2-methyl-4,5-benzindenyl)hafnium dichloride, dimethylsilanediylbis(2-ethyl-4,5-benzindenyl)hafnium dichloride, methylphenylsilanediylbis(2-ethyl-4,5-benzindenyl)hafnium dichloride, diphenylsilanediylbis(2-methyl-4,5-benzindenyl)hafnium dichloride, diphenylsilanediylbis(2-ethyl-4,5-benzindenyl)hafnium dichloride, diphenylsilanediylbis(2-methylindenyl)hafnium dichloride, dimethylsilanediylbis(2-methyl-4-phenylindenyl)hafnium dichloride, dimethylsilanediylbis(2-ethyl-4-phenylindenyl)hafnium dichloride, dimethylsilanediylbis(2-methyl-4-(1-naphthyl)indenyl)hafnium dichloride, dimethylsilanediylbis(2-ethyl-4-(1-naphthyl)indenyl)hafnium dichloride, dimethylsilanediylbis(2-propyl-4-(9-phenanthryl)indenyl)hafnium dichloride, dimethylsilanediylbis(2-methyl-4-isopropylindenyl)hafnium dichloride, dimethylsilanediylbis(2,7-dimethyl-4-isopropylindenyl)hafnium dichloride, dimethylsilanediylbis(2-methyl-4,6-diisopropylindenyl)hafnium dichloride, dimethylsilanediylbis(2-methyl-4[p-trifluoromethylphenyl]indenyl)hafnium dichloride, dimethylsilanediylbis(2-methyl-4-[3',5'-dimethylphenyl]indenyl)hafnium dichloride, dimethylsilanediylbis(2-methyl-4-[4'-tert-butylphenyl]indenyl)hafnium dichloride, diethylsilanediylbis(2-methyl-4-[4'-tert-butylphenyl]indenyl)hafnium dichloride, dimethylsilanediylbis(2-ethyl-4-[4'-tert-butylphenyl]indenyl)hafnium dichloride, dimethylsilanediylbis(2-propyl-4-[4'-tert-butylphenyl]indenyl)hafnium dichloride, dimethylsilanediylbis(2-isopropyl-4-[4'-tert-butylphenyl]indenyl)hafnium dichloride, dimethylsilanediylbis(2-n-butyl-4-[4'-tert-butylphenyl]indenyl)hafnium dichloride, dimethylsilanediylbis(2-hexyl-4-[4'-tert-butylphenyl]indenyl)hafnium dichloride, dimethylsilanediyl(2-isopropyl-4-(1-naphthyl)indenyl)(2-methyl-4-(1-naphthyl)indenyl)hafnium dichloride, dimethylsilanediyl(2-isopropyl-4-[4'-tert-butylphenyl]indenyl)(2-methyl-4-['naphthyl]indenyl)hafnium dichloride and ethylene(2-isopropyl-4-[4'-tert-butylphenyl]indenyl)(2-methyl-4-[4'-tert-butylphenyl]indenyl)hafnium dichloride, and also the corresponding dimethylhafnium, monochloromono(alkylaryloxy)hafnium and di(alkylaryloxy)hafnium compounds. The complexes can be used in the rac form, the meso form or as mixtures of the two.

Hybrid Catalyst Component (B)

Hybrid catalyst component (B) is an iron catalyst complex of the general formulae (IIIa) with at least one ligand, preferably a tridentate ligand.

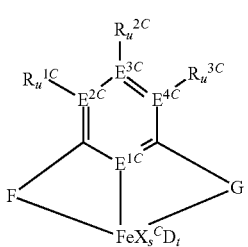

(IIIa)

Wherein the variables F and G, independently of one another, are selected from the group consisting of:

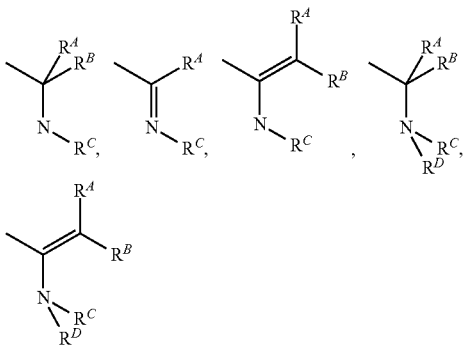

Where preferably, at least one of F and G is an enamine or imino radical and when F is imino or G is imino, G and F each bear at least one aryl radical, a halogen or a tertalkyl substituent in the ortho-position, together giving rise to the tridentate ligand of formula IIIa. More preferably, at least one of F or G are an enamine radical. When both F and G are imino, G and F each bear at least one, aryl radical with each said aryl radical bearing at least one halogen or at least one tertalkyl substituent, halogen or one tertalkyl, in the ortho-position.

The $R^{1C}$-$R^{3C}$ groups are one or more identical or different compounds selected from the group consisting of: hydrogen, $C_1$-$C_{22}$-alkyl, $C_2$-$C_{22}$-alkenyl, $C_6$-$C_{22}$-aryl and alkylaryl compounds having from 1 to 10 carbon atoms in the alkyl part and 6-20 carbon atoms in the aryl part, halogen or $NR^{18C}_2$, $OR^{18C}$, $SiR^{19C}_3$, compounds where the organic radicals $R^{1C}$-$R^{3C}$ can also be substituted by halogens and/or two vicinal radicals $R^{1C}$-$R^{3C}$ can also be joined to form a five, six or seven membered ring, and/or two vicinal radicals $R^{1C}$-$R^{3C}$ are joined to form a five, six or seven membered heterocycle compound containing at least one atom from the group consisting of N, P, O and S.

The $R^A$,$R^B$ groups are one or more identical or different compounds selected from the group consisting of: hydrogen, $C_1$-$C_{20}$-alkyl, $C_2$-$C_{20}$-alkenyl, $C_6$-$C_{20}$-aryl, arylalkyl compounds having 1 to 10 C atoms in the alkyl radical and 6 to 20 C atoms in the aryl radical, or $SiR^{19C}_3$, wherein the organic radicals $R^A$,$R^B$ can also be substituted by halogens, and/or in each case two radicals $R^A$,$R^B$ can also be bonded with one another to form a five or six membered ring.

The $R^C$,$R^D$ groups are one or more identical or different compounds selected from the group consisting of: hydrogen, $C_1$-$C_{20}$-alkyl, $C_2$-$C_{20}$-alkenyl, $C_6$-$C_{20}$-aryl, arylalkyl compounds having 1 to 10 C atoms in the alkyl radical and 6 to 20 C atoms in the aryl radical, or $SiR^{19C}_3$, wherein the organic radicals $R^C$,$R^D$ can also be substituted by halogens, and/or in each case two radicals $R^C$,$R^D$ can also be bonded with one another to form a five or six membered ring.

$E^{1C}$ is nitrogen or phosphorus.

$E^{2C}$-$E^{4C}$ are each identical or different compounds selected from the group consisting of: carbon, nitrogen and phosphorus.

The group u is 0 when $E^{2C}$-$E^{4C}$ is nitrogen or phosphorus and is 1 when $E^{2C}$-$E^{4C}$ is carbon.

The radicals $R^{18C}$, $R^{19C}$ and $X^C$ are defined in and for formula IIIa above identically as defined for formula III below.

D is an uncharged donor.

s is the integer 1, 2, 3 or 4.

t is 0 to 4.

Preferably, (B) is a compound having the formula (III):

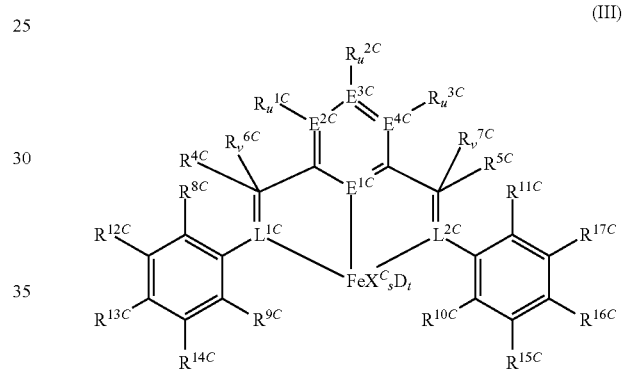

(III)

Wherein:

$E^{1C}$ is nitrogen or phosphorus.

$E^{2C}$-$E^{4C}$ are each identical or different compounds selected from the group consisting of: carbon, nitrogen and phosphorus.

$R^{1C}$-$R^{3C}$ are each identical or different compounds selected from the group consisting of: hydrogen $C_1$-$C_{22}$-alkyl, $C_2$-$C_{22}$-alkenyl, $C_6$-$C_{22}$-aryl and alkylaryl compounds having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{1C}$-$R^{3C}$ can also be substituted by halogens and/or two vicinal radicals $R^{1C}$-$R^{3C}$ can also be joined to form a five, six or seven membered ring, and/or two vicinal radicals $R^{1C}$-$R^{3C}$ are joined to form a five, six or seven membered heterocycle compound containing at least one atom from the group consisting of N, P, O and S.

$R^{4C}$-$R^{7C}$ are each identical or different compounds selected from the group consisting of: hydrogen, $C_1$-$C_{22}$-alkyl, $C_2$-$C_{22}$-alkenyl, $C_6$-$C_{22}$-aryl and alkylaryl compounds having from 1 to 10 carbon atoms in the alkyl part and 6-20 carbon atoms in the aryl part, $NR^{18C}_2$, $SiR^{19C}_3$, where the organic radicals $R^{4C}$-$R^{7C}$ can also be substituted by halogens and/or two geminal or vicinal radicals $R^{4C}$-$R^{7C}$ can also be joined to form a five, six or seven membered ring, and/or two geminal or vicinal radicals $R^{4C}$-$R^{9C}$ are joined to form a five, six or seven membered heterocycle compound containing at least one atom from the group consisting of N, P, O and S, and when v is 0, $R^{6C}$ is a bond to $L^{1C}$ and/or $R^{7C}$ is a bond to $L^{2C}$ so that $L^{1C}$ forms a double bond to the carbon atom bearing $R^{4C}$ and/or $L^{2C}$ forms a double bond to the carbon atom bearing $R^{5C}$.

u is 0 when $E^{2C}$-$E^{4C}$ is nitrogen or phosphorus and u is 1 when $E^{2C}$-$E^{4C}$ is carbon.

$L^{1C}$-$L^{2C}$ are each identical or different compounds selected from the group consisting of: nitrogen and phosphorus.

$R^{8C}$-$R^{11C}$ are each identical or different compounds selected from the group consisting of: hydrogen, $C_1$-$C_{22}$-alkyl, $C_2$-$C_{22}$-alkenyl, $C_6$-$C_{22}$-aryl and alkylaryl compounds having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{8C}$-$R^{11C}$ can also be substituted by halogens and/or two vicinal radicals $R^{8C}$-$R^{17C}$ can also be joined to form a five, six or seven membered ring, and/or two vicinal radicals $R^{8C}$-$R^{17C}$ are joined to form a five, six or seven membered heterocycle compound containing at least one atom from the group consisting of N, P, O and S, and with the proviso that at least $R^{8C}$ and $R^{10C}$ are halogen or a tert-$C_1$-$C_{22}$-alkyl group.

$R^{12C}$-$R^{17C}$ are each identical or different compounds selected from the group consisting of: hydrogen, $C_1$-$C_{22}$-alkyl, $C_2$-$C_{22}$-alkenyl, $C_6$-$C_{22}$-aryl and alkylaryl compounds having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{12C}$-$R^{17C}$ can also be substituted by halogens and/or two vicinal radicals $R^{8C}$-$R^{17C}$ can also be joined to form a five, six or seven membered ring, and/or two vicinal radicals $R^{8C}$-$R^{17C}$ are joined to form a five, six or seven membered heterocycle compound containing at least one atom from the group consisting of N, P, O and S, The v indices are each identical or different integers of 0 or 1.

The $X^C$ radicals each identical or different compounds selected from the group consisting of: fluorine, chlorine, bromine, iodine, hydrogen, $C_1$-$C_{10}$-alkyl, $C_2$-$C_{10}$-alkenyl, $C_6$-$C_{20}$-aryl and alkylaryl compounds having 1-10 carbon atoms in the alkyl part and 6-20 carbon atoms in the aryl part, $NR_{18C}^2$, $OR^{18C}$, $SR^{18C}$, $SO_3R^{18C}$, $OC(O)R^{18C}$, CN, SCN, β-diketonate, CO, $BF_4^-$, $PF_6^-$ or a bulky noncoordinating anion and the radicals $X^C$ can be joined to one another.

The $R^{18C}$ radicals are each identical or different compounds selected from the group consisting of: hydrogen, $C_1$-$C_{20}$-alkyl, $C_2$-$C_{20}$-alkenyl, $C_6$-$C_{20}$-aryl and alkylaryl compounds having from 1 to 10 carbon atoms in the alkyl part and 6-20 carbon atoms in the aryl part, $SiR^{19C}_3$, where the organic radicals $R^{18C}$ can also be substituted by halogens, nitrogen or oxygen containing groups and two radicals $R^{18C}$ can also be joined to form a five or six membered ring.

The $R^{19C}$ radicals are each identical or different compounds selected from the group consisting of: hydrogen, $C_1$-$C_{20}$-alkyl, $C_2$-$C_{20}$-alkenyl, $C_6$-$C_{20}$-aryl and alkylaryl compounds having from 1 to 10 carbon atoms in the alkyl part and 6-20 carbon atoms in the aryl part, where the organic radicals $R^{19C}$ can also be substituted by halogens, nitrogen or oxygen containing groups and two radicals $R^{19C}$ can also be joined to form a five or six membered ring.

s is the integer 1, 2, 3 or 4.

D is an uncharged donor.

t is an integer from 0 to 4.

The three atoms $E^{2C}$-$E^{4C}$ in formula (III) can be identical or different. If $E^{1C}$ is phosphorus, then $E^{2C}$-$E^{4C}$ are each preferably each carbon. If $E^{1C}$ is nitrogen, then $E^{2C}$-$E^{4C}$ are each preferably nitrogen or carbon.

The substituents $R^{1C}$-$R^{3C}$ and $R^{8C}$-$R^{17C}$ can be varied within a wide range. Possible carboorganic substituents $R^{1C}$-$R^{3C}$ and $R^{8C}$-$R^{17C}$ include, but are not limited to the following: $C_1$-$C_{22}$-alkyl which can be the following linear or branched compounds (e.g., methyl, ethyl, n-propyl, isopropyl, n-butyl, isobutyl, tert-butyl, n-pentyl, n-hexyl, n-heptyl, n-octyl, n-nonyl, n-decyl or n-dodecyl), 5 to 7 membered cycloalkyl which can in turn bear a $C_1$-$C_{10}$-alkyl group and/or $C_6$-$C_{10}$-aryl group as substituents (e.g. cyclopropyl, cyclobutyl, cyclopentyl, cyclohexyl, cycloheptyl, cyclooctyl, cyclononyl or cyclododecyl), $C_2$-$C_{22}$-alkenyl which can be linear, cyclic or branched and in which the double bond can be internal or terminal (e.g. vinyl, 1-allyl, 2-allyl, 3-allyl, butenyl, pentenyl, hexenyl, cyclopentenyl, cyclohexenyl, cyclooctenyl or cyclooctadienyl), $C_6$-$C_{22}$-aryl which can be substituted by further alkyl groups (e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl) or arylalkyl which can be substituted by further alkyl groups (e.g. benzyl, o-, m-, p-methylbenzyl, 1- or 2-ethylphenyl. The two radicals $R^{1C}$-$R^{3C}$ and/or two vicinal radicals $R^{8C}$-$R^{17C}$ can also be joined to form a 5, 6 or 7 membered ring and/or two of the vicinal radicals $R^{1C}$-$R^{3C}$ and/or two of the vicinal radicals $R^{8C}$-$R^{17C}$ can be joined to form a five, six or seven membered heterocycle compound containing at least one atom from the group consisting of N, P, O and S and/or the organic radicals $R^{1C}$-$R^{3C}$ and/or $R^{8C}$-$R^{17C}$ can also be substituted by halogens such as fluorine, chlorine or bromine.

Furthermore, $R^{1C}$-$R^{3C}$ and $R^{8C}$-$R^{17C}$ can also be amino $NR^{18C}_2$ or $N(SiR^{19C}_3)_2$, alkoxy or aryloxy $OR^{18C}$ compounds (e.g., dimethylamino, N-pyrrolidinyl, picolinyl, methoxy, ethoxy or isopropoxy) or halogen compounds such as fluorine, chlorine or bromine. Possible radicals $R^{19C}$ in organosilicon substituents $SiR^{19C}_3$ are the same carboorganic radicals as have been described above for $R^{1C}$-$R^{3C}$, where two $R^{19C}$ can also be joined to form a 5 or 6 membered ring (e.g. trimethylsilyl, triethylsilyl, butyldimethylsilyl, tributylsilyl, tri-tert-butylsilyl, triallylsilyl, triphenylsilyl or dimethylphenylsilyl). These $SiR^{19C}_3$ radicals can also be bound to $E^{2C}$-$E^{4C}$ via an oxygen or nitrogen, for example trimethylsilyloxy, triethylsilyloxy, butyldimethylsilyloxy, tributylsilyloxy or tri-tert-butylsilyloxy.

Preferred $R^{1C}$-$R^{3C}$ radicals are identical or different compounds selected from the group consisting of: hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, ortho-dialkyl- or -dichloro-substituted phenyls, trialkyl- or trichloro-substituted phenyls, naphthyl, biphenyl and anthranyl. Particularly preferred organosilicon substituents are trialkylsilyl groups having from 1 to 10 carbon atoms in the alkyl radical, in particular trimethylsilyl groups.

Preferred $R^{12C}$-$R^{17C}$ radicals are identical or different compounds selected from the group consisting of: hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine, in particular hydrogen. In particular, $R^{13C}$ and $R^{16C}$ are each methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine or bromine and $R^{12C}$, $R^{14C}$, R15C and $R^{17C}$ are each hydrogen.

Preferred $R^{9C}$ and $R^{11C}$ radicals are identical or different compounds selected from the group consisting of: hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine. In particular, $R^{8C}$ and $R^{10C}$ are preferably a halogen such as fluorine, chlorine or bromine, particularly chlorine and $R^{9C}$ and $R^{11C}$ are each a $C_1$-$C_{22}$-alkyl which can also be substituted by halogens, in particular a $C_1$-$C_{22}$-n-alkyl which can also be substituted by halogens (e.g. methyl, trifluoromethyl, ethyl, n-propyl, n-butyl, n-pentyl, n-hexyl, n-heptyl, n-octyl, vinyl, or a halogen such as fluorine, chlorine or bromine). In an exemplary embodiment, $R^{8C}$ and $R^{10C}$ are a tertiary $C_1$-$C_{22}$-alkyl radical, particularly tert-butyl and $R^{9C}$ and $R^{11C}$ are each hydrogen or a halogen such as fluorine, chlorine or bromine.

In particular, $R^{12C}$, $R^{14C}$, $R^{15C}$ and $R^{17C}$ are identical, $R^{13C}$ and $R^{16C}$ are identical, R9C and $R^{11C}$ are identical and $R^{8C}$ and $R^{10C}$ are identical.

The substituents $R^{4C}$-$R^{7C}$ can be varied within a wide range. Possible carboorganic substituents $R^{4C}$-$R^{7C}$ include, but are not limited to the following: $C_1$-$C_{22}$-alkyl which can be linear or branched (e.g., methyl, ethyl, n-propyl, isopropyl, n-butyl, isobutyl, tert-butyl, n-pentyl, n-hexyl, n-heptyl, n-octyl, n-nonyl, n-decyl or n-dodecyl), 5 to 7 membered cycloalkyl which can in turn bear a $C_1$-$C_{10}$-alkyl group and/or $C_6$-$C_{10}$-aryl group as substituent (e.g. cyclopropyl, cyclobutyl, cyclopentyl, cyclohexyl, cycloheptyl, cyclooctyl, cyclononyl or cyclododecyl), $C_2$-$C_{22}$-alkenyl which can be linear, cyclic or branched and in which the double bond can be internal or terminal (e.g. vinyl, 1-allyl, 2-allyl, 3-allyl, butenyl, pentenyl, hexenyl, cyclopentenyl, cyclohexenyl, cyclooctenyl or cyclooctadienyl), $C_6$-$C_{22}$-aryl which can be substituted by further alkyl groups (e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl) or arylalkyl compounds where the arylalkyl can be substituted by further alkyl groups (e.g. benzyl, o-, m-, p-methylbenzyl, 1- or 2-ethylphenyl. The radicals $R^{4C}$-$R^{7C}$ can also be joined to form a 5, 6 or 7 membered ring and/or the geminal radicals $R^{4C}$-$R^{7C}$ can be joined to form a five, six or seven membered heterocycle compound containing at least one atom from the group consisting of N, P, O and S and/or the organic radicals $R^{4C}$-$R^{7C}$ can also be substituted by halogens such as fluorine, chlorine or bromine. Furthermore, $R^{4C}$-$R^{7C}$ can be amino $NR^{18C}_2$ or $N(SiR^{19C}_3)_2$, for example dimethylamino, N-pyrrolidinyl or picolinyl. Possible radicals $R^{19C}$ in organosilicone substituents $SiR^{19C}_3$ are the same carboorganic radicals as have been described above for $R^{1C}$-$R^{3C}$, where two $R^{19C}$ can also be joined to form a 5 or 6 membered ring (e.g. trimethylsilyl, triethylsilyl, butyldimethylsilyl, tributylsilyl, tri-tert-butylsilyl, triallylsilyl, triphenylsilyl or dimethylphenylsilyl). These $SiR^{19C}_3$ radicals can also be bound via nitrogen to the carbon bearing them. When v is 0, $R^{6C}$ is a bond to $L^{1C}$ and/or $R^{7C}$ is a bond to $L^{2C}$, so that $L^{1C}$ forms a double bond to the carbon atom bearing $R^{4C}$ and/or $L^{2C}$ forms a double bond to the carbon atom bearing $R^{5C}$.

Preferably, radicals $R^{4C}$-$R^{7C}$ are hydrogen, methyl, ethyl, n-propyl, isopropyl, n-butyl, isobutyl, tert-butyl, n-pentyl, n-hexyl, n-heptyl, n-octyl, benzyl, phenyl, ortho-dialkyl- or dichloro-substituted phenyls, trialkyl- or trichloro-substituted phenyls, naphthyl, biphenyl or anthranyl compounds. Preference is also given to amide substituents $NR^{18C}_2$, in particular secondary amides such as dimethylamide, N-ethylmethylamide, diethylamide, N-methylpropylamide, N-methylisopropylamide, N-ethylisopropylamide, dipropylamide, diisopropylamide, N-methylbutylamide, N-ethylbutylamide, N-methyl-tert-butylamide, N-tert-butylisopropylamide, dibutylamide, di-sec-butylamide, diisobutylamide, tert-amyl-tert-butylamide, dipentylamide, N-methylhexylamide, dihexylamide, tert-amyl-tert-octylamide, dioctylamide, bis (2-ethylhexyl)amide, didecylamide, N-methyloctadecylamide, N-methylcyclohexylamide, N-ethylcyclohexylamide, N-isopropylcyclohexyl amide, N-tert-butylcyclohexylamide, dicyclohexylamide, pyrrolidine, piperidine, hexamethylenimine, decahydroquinoline, diphenylamine, N-methylanilide or N-ethylanilide.

$L^{1C}$ and $L^{2C}$ are identical or different compounds selected from the group consisting of: nitrogen and phosphorus. When v is 0, $L^{1C}$ and $L^{2C}$ can form a double bond with the carbon atom bearing $R^{4C}$ or $R^{5C}$. In particular, when v is 0, $L^{1C}$ and/or $L^{2C}$ together with the carbon atom bearing $R^{4C}$ or $R^{5C}$ form an imino group —CR4C=N or —CR5C=N. When v is 1, $L^{1C}$ and/or $L^{2C}$ together with the carbon atom bearing $R^{4C}$ or $R^{5C}$ forms an amido group —CR4CR6C—N$^-$— or —CR5CR7C—N$^-$—.

The ligands $X^C$ can result from the choice of the appropriate starting metal compounds used for the synthesis of the iron complexes, but can also be varied afterward. Possible ligands $X^C$ can be halogens such as fluorine, chlorine, bromine or iodine. Alkyl radicals such as methyl, ethyl, propyl, butyl, vinyl, allyl, phenyl or benzyl radicals are also suitable $X^C$ ligands. $X^C$ can also be trifluoroacetate, BF4$^-$, PF6$^-$ and weakly coordinating or noncoordinating anions (See e.g., S. Strauss in Chem. Rev. 1993, 93, 927-942; B(C6F5)4$^-$). Amides, alkoxides, sulfonates, carboxylates and P-diketonates are also particularly useful $X^C$ ligands. $X^C$ can further be dimethylamide, methoxide, ethoxide, isopropoxide, phenoxide, naphthoxide, triflate, p-toluenesulfonate, acetate or acetylacetonate compounds.

The s substituents $R^{18C}$ can include but are not limited to the following compounds: $C_1$-$C_{20}$-alkyl which can be linear or branched (e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl), 5 to 7 membered cycloalkyl which can in turn bear a $C_6$-$C_{10}$-aryl group as substituent (e.g. cyclopropyl, cyclobutyl, cyclopentyl, cyclohexyl, cycloheptyl, cyclooctyl, cyclononyl or cyclododecyl), $C_2$-$C_{20}$-alkenyl which can be linear, cyclic or branched and in which the double bond can be internal or terminal (e.g. vinyl, 1-allyl, 2-allyl, 3-allyl, butenyl, pentenyl, hexenyl, cyclopentenyl, cyclohexenyl, cyclooctenyl or cyclooctadienyl), $C_6$-$C_{20}$-aryl which can be substituted by further alkyl groups and/or N- or O-containing radicals (e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, 2-methoxyphenyl, 2-N,N-dimethylaminophenyl) or arylalkyl compounds which can be substituted by further alkyl groups (e.g. benzyl, o-, p-methylbenzyl, 1- or 2-ethylphenyl). The two radicals $R^{18C}$ can also be joined to form a 5 or 6 membered ring and the organic radicals $R^{18C}$ can also be substituted by halogens such as fluorine, chlorine or bromine. Possible radicals $R^{19C}$ in organosilicon substituents $SiR1^{19C}_3$ are the same radicals which have been described above for $R^{18C}$. The two radicals $R^{19C}$ can also be joined to form a 5 or 6 membered ring (e.g. trimethylsilyl, triethylsilyl, butyldimethylsilyl, tributylsilyl, triallylsilyl, triphenylsilyl or dimethylphenylsilyl).

The number s of the ligands $X^C$ depends on the oxidation state of the iron. The number s can thus not be given in general terms. The oxidation state of the iron in catalytically active complexes is usually known to those skilled in the art. However, it is also possible to use complexes whose oxidation state does not correspond to that of the active catalyst. Such complexes can then be appropriately reduced or oxidized by means of suitable activators. Iron complexes in the oxidation state +3 or +2 are particularly useful.

D is an uncharged donor, in particular an uncharged Lewis base or Lewis acid, for example amines, alcohols, ethers, ketones, aldehydes, esters, sulfides or phosphines which can be bound to the iron center or else still be present as residual solvent from the preparation of the iron complexes. The number t of the ligands D can be from 0 to 4 and is often dependent on the solvent in which the iron complex is prepared and the time for which the resulting complexes are dried and can therefore also be a nonintegral number such as 0.5 or 1.5.

The preparation of hybrid catalyst component (B) is described, for example, in J. Am. Chem. Soc. 120, p. 4049 ff. (1998), J. Chem. Soc., Chem. Commun. 1998, 849, and WO 98/27124. Hybrid catalyst component (B) can include, but is not limited to the following: 2,6-Bis[1-(2-tert.butylphenylimino)ethyl]pyridine iron(II)dichloride, 2,6-B is [1-(2-tert.butyl-6-chlorophen ylimino)ethyl]pyridine iron(II) dichloride, -2,6-Bis[1-(2-chloro-6-methylphenylimino) ethyl]pyridine iron(II)dichloride, 2,6-Bis[1-(2,4-dichlorophenylimino)ethyl]pyridine iron(II)dichloride, 2,6-Bis[1-(2,6-dichlorophenylimino)ethyl]pyridine iron(II) dichloride, 2,6-Bis[1-(2,4-dichlorophenylimino)methyl] pyridine iron(II)dichloride, 2,6-B is [1-(2,4-dichloro-6-methylphenylimino)ethyl]pyridine iron(II)dichloride-2,6-Bis[1-(2,4-difluorophenylimino)ethyl]pyridine iron(II) dichloride, 2,6-Bis[1-(2,4-dibromophenylimino)ethyl] pyridine iron(II)dichloride or the respective trichlorides, dibromides or tribromides.

In an exemplary embodiment, the molar ratio of hybrid catalyst component (A) to hybrid catalyst component (B) is in the range from 1:100 to 100:1.

The hybrid catalyst system can comprise one or more activators (C), which can be brought into contact with the hybrid catalyst components (A) and (B). In case of a hybrid catalyst, the activation of the metallocene catalyst component (A) and of the iron catalyst component (B) of the hybrid catalyst composition can be carried out using the same activator or activator mixture or different activators. The activator or activators (C) can be used in any amount based on the hybrid catalyst component (A) and (B) of the catalyst system.

Suitable compounds (C) include, but are not limited to aluminoxanes and strong uncharged Lewis acids, as described, for example, in WO 00/31090; hydroxyalurninoxanes such as those described in WO 00/24787, ionic compounds having a Lewis-acid cation as described, for example, in WO 91/09882 or ionic compounds containing a Brönsted acid as cation, such as protonated amine or aniline derivatives.

Component (C) can be selected from the group of compounds consisting of: boranes and boroxins such as trialkylborane, triarylborane or trimethylboroxin. M Component (C) can be selected from the group of compounds consisting of: boranes which bear at least two perfluorinated aryl radicals. Component (C) can be selected from the group of compounds consisting of: triphenylborane, tris(4-fluorophenyl) borane, tris(3,5-difluorophenyl)borane, tris(4-fluoromethylphenyl)borane, tris(pentafluorophenyl)borane, tris(tolyl)borane, tris(3,5-dimethylphenyl)borane, tris(3,5-difluorophenyl)borane or tris(3,4,5-trifluorophenyl)borane.

For hybrid catalyst components (A) and (B), component (C) can be an aluminoxane compound or salt-like compounds including N,N-dimethylanilinium tetrakis(pentafluorophenyl)borate, N,N-dimethylcyclohexylammonium tetrakis (pentafluorophenyl)borate, N,N-dimethylbenzylammonium tetrakis(pentafluorophenyl)borate or trityl tetrakispentafluorophenylborate.

To enable the single-site catalysts to be used in polymerization in the gas phase or in suspension, it is often advantageous to use the complexes in the form of a solid, i.e. for them to be applied to a solid support (D). Furthermore, the supported complexes have a high productivity. The metallocene catalyst component (A) and/or the iron catalyst component (B) can therefore also optionally be immobilized on an organic or inorganic support (D) and be used in supported form in the polymerization. This enables, for example, deposits in the reactor to be avoided and the polymer morphology to be controlled. The support (D) material can include silica gel, magnesium chloride, aluminum oxide, mesoporous materials, aluminosilicates, hydrotalcites and organic polymers such as polyethylene, polypropylene, polystyrene, polytetrafluoroethylene or polymers bearing polar functional groups, such as copolymers of ethene and acrylic esters, acrolein or vinyl acetate.

An exemplary hybrid catalyst system can include at least one metallocene catalyst component (A), at least one iron catalyst component (B), at least one activating compound (C) and at least one support component (D). It is possible for both the metallocene catalyst component (A) and the iron catalyst component (B) to be supported, or only one of the two components can be supported.

Support component (D) can be a finely divided organic or inorganic solid including, but not limited to a porous support such as talc, a sheet silicate such as montmorillonite, mica or an inorganic oxide or a finely divided polymer powder (e.g. polyolefin or a polymer having polar functional groups), hydrotalcites and calcined hydrotalcites.

For olefin polymerization, support component (D) can be a silica gel since, a spray-dried silica gel (e.g., spherical agglomerates of relatively small granular particles, a dried and/or calcined silica gel.

The hybrid catalyst system can further comprise, as additional component (E), a metal compound of the general formula (XX):

$$M^G(R^{1G})_r{}^G(R^{2G})_s{}^G(R^{3G})_tG \qquad (XX)$$

Wherein:

$M_G$ is Li, Na, K, Be, Mg, Ca, Sr, Ba, boron, aluminum, gallium, indium, thallium, zinc, in particular Li, Na, K, Mg, boron, aluminum or Zn.

$R^{1G}$ is hydrogen, $C_1$-$C_{10}$-alkyl, $C_6$-$C_{15}$-aryl, alkylaryl or arylalkyl each having from 1 to 10 carbon atoms in the alkyl part and from 6 to 20 carbon atoms in the aryl part.

$R^{2G}$ and $R^{3G}$ are each a hydrogen, halogen, $C_1$-$C_{10}$-alkyl, $C_6$-$C_{15}$-aryl, alkylaryl, arylalkyl or alkoxy each having from 1 to 20 carbon atoms in the alkyl part and from 6 to 20 carbon atoms in the aryl part, or alkoxy together with $C_1$-$C_{10}$-alkyl or $C_6$-$C_{15}$-aryl.

$r^G$ is an integer from 1 to 3.

$s^G$ and $t^G$ are integers from 0 to 2, with the sum $r^G+s^G+t^G$ corresponding to the valence of $M^G$.

Metal compounds of the formula (XX) can include the following: methyllithium, ethyllithium, n-butyllithium, methylmagnesium chloride, methylmagnesium bromide, ethylmagnesium chloride, ethylmagnesium bromide, butylmagnesium chloride, dimethylmagnesium, diethylmagnesium, dibutylmagnesium, n-butyl-n-octylmagnesium, n-butyl-n-heptylmagnesium, in particular n-butyl-n-octylmagnesium, tri-n-hexylaluminum, triisobutylaluminum, tri-n-butylaluminum, triethylaluminum, dimethylaluminum chloride, dimethylaluminum fluoride, methylaluminum dichloride, methylaluminum sesquichloride, diethylaluminum chloride and trimethylaluminum and mixtures thereof. The partial hydrolysis products of aluminum alkyls with alcohols can also be used.

In an exemplary embodiment when a metal compound (E) is used, it is preferably present in the catalyst system in such an amount that the molar ratio of $M^G$ from formula (XX) to the sum of the transition metals from the metallocene catalyst component (A) and the iron catalyst component (B) is from 3000:1 to 0.1:1, preferably from 800:1 to 0.2:1 and more preferably from 100:1 to 1:1.

In another exemplary embodiment, a catalyst solid is prepared from the components (A), (B), (C) and (D) as described above and this is brought into contact with the component (E) during, at the commencement of or shortly before the polymerization.

Component (E) can first be brought into contact with the α-olefin to be polymerized and subsequently the catalyst solid system comprising the components (A), (B), (C) and (D) can be added as described above.

The support (D) is can also first be brought into contact with the component (E), and the components (A) and (B) and any further activator (C) are then dealt with as described above.

It is also possible for the catalyst system to first be prepolymerized with α-olefins, preferably linear $C_2$-$C_{10}$-1-alkenes and in particular ethylene or propylene, and the resulting prepolymerized catalyst solid then to be used in the actual polymerization.

The catalysts and hybrid catalyst systems herein disclosed can be used in a polymerization or copolymerization reaction to produce polyethylene.

In the copolymerization of polyethylene, the comonomer of the PE is preferably selected from 1-butene, 1-pentene, 1-hexene, 4-methyl-1-pentene, 1-heptene or 1-octene. The polymerization can be carried out as known in the art or as described with respect to WO 20009/103516 A2, which is herein incorporated by reference in its entirety.

B. Polymerization of Polyethylene Using the Hybrid Catalyst

Polymerization of ethylene can be carried out using the hybrid catalyst systems herein disclosed including a metallocene catalyst component (A) and the iron catalyst component (B). The polymerization can be conducted in a fluidized-bed reactor at a predetermined temperature and pressure using an ethylene monomer and 1-hexene co-monomer. The polymerization reaction can be used to produce polyethylene. Additional synthetic polymerization protocols are provided in WO 2005/103095.

Preferably, the PE produced using the hybrid catalyst has a density within the range from 0.91 to 0.955 g/cm$^3$, more preferably of from 0.9305 to 0.945 g/cm$^3$ and most preferably in the range from 0.931 to 0.940 g/cm$^3$ according to ASTM-D 1505. Additionally, the PE preferably has a melt index (MI) within the range of 0.5 and 15 g/10 min, alternatively from 0.5 to 10 g/10 min, alternatively from 0.5 to 6 g/10 min, and alternatively from 0.8 to 2.5 g/10 min ASTM-D 1238, using a piston load of 2.16 kg and temperature of 190° C. The weight average molar mass Mw of the PE is in the range of from 20,000 g/mol to 500,000 g/mol, preferably from 50,000 g/mol to 300,000 g/mol and particularly preferably from 80,000 g/mol to 200,000 g/mol. In some embodiments, the molecular weight distribution of the hybrid polyolefin (Mw/Mn, where Mn is the number average molar mass) is greater than or equal to 5, or preferably within the range of from 5-15, more preferably within the range 7-10.

Preferably, the PE produced using the hybrid catalyst has a CDBI of 20-70%, preferably of less than 50%. CDBI (composition distribution breadth index) is a measure of the breadth of the distribution of the composition. This is described, for example, in WO 93/03093. The CDBI is defined as the percent by weight or mass fraction of the copolymer molecules having a comonomer content of ±25% of the mean molar total comonomer content, i.e. the share of comonomer molecules whose comonomer content is within 50% of the average comonomer content. This is determined by TREF (temperature rising elution fraction) analysis (Wild et al. J. Poly. Sci., Poly. Phys. Ed. Vol. 20, (1982), 441 or U.S. Pat. No. 5,008,204). Optionally, it may be determined by more recent CRYSTAF analysis.

The PE produced using the hybrid catalyst has preferably at least 0.6 vinyl groups/1000 carbon atoms, e.g. of from 0.6 up to 2 vinyl groups/1000 carbon atoms, preferably of from 0.9 to 10 vinyl groups/1000 carbon atoms and more preferably of from 1 to 5 vinyl groups/1000 carbon atoms and most preferably of from 1.2 to 2 vinyl groups/1000 carbon atoms. The content of vinyl groups/1000 carbon atoms is determined by means of 112, according to ASTM D 6248-98. For the present purposes, the expression vinyl groups refers to $CH=CH_2$ groups; vinylidene groups and internal olefinic groups are not encompassed by this expression. Vinyl groups are usually attributed to a polymer termination reaction after an ethylene insertion, while vinylidene end groups are usually formed after a polymer termination reaction after a comonomer insertion. Preference is given to at least 0.9 vinyl groups/1000 carbon atoms, preferably from 1 to 3 vinyl groups/1000 carbon atoms and particularly preferably from 1.3 to 2 vinyl groups/1000 carbon atoms being present in the 20% by weight of the polyethylene having the lowest molar masses. This can be determined by solvent-nonsolvent fractionation, later called Holtrup fractionation as described in W. Holtrup, Makromol. Chem. 178, 2335 (1977) coupled with IR measurement of the different fractions, with the vinyl groups being measured in accordance with ASTM D 6248-98. Xylene and ethylene glycol diethyl ether at 130° C. were used as solvents for the fractionation. 5 g of polymer were used and were divided into 8 fractions.

The PE produced using the hybrid catalyst preferably has at least 0.05 vinylidene groups/1000 carbon atoms, in particular from 0.1 to 1 vinylidene groups/1000 carbon atoms and particularly preferably from 0.14 to 0.4 vinylidene groups/1000 carbon atoms. The determination is carried out by IR measurement in accordance with ASTM D 6248-98.

The PE produced using the hybrid catalyst preferably has from 0.01 to 20 branches/1000 carbon atoms, more preferably from 0.5 to 10 branches/1000 carbon atoms and particularly preferably from 1.5 to 8 branches/1000 carbon atoms. The branches/1000 carbon atoms are determined by means of $^{13}$C-NMR, as described by James C. Randall, JMS-REV. Macromol. Chem. Phys., C29 (2&3), 201-317 (1989), and refer to the total content of $CH_3$ groups/1000 carbon atoms including end groups. The branching content is to be understood as side chains measured as $CH_3$/1000 carbon atoms, preferably from 1 to 10 $CH_3$/1000 carbon atoms. It is particularly preferred in polyethylene copolymerized with 1-butene, 1-hexene or 1-octene as the 1-alkene to have of from 0.01 to 20 ethyl, butyl or hexyl short chain branches/1000 carbon atoms, more preferably from 1 to 10 ethyl, butyl or hexyl branches/1000 carbon atoms and particularly preferably of from 2 to 6 ethyl, butyl or hexyl branches/1000 carbon atoms. It may otherwise be coined "short chain branching" (SCB) with such side branches being $C_2$-$C_6$ side chains.

II. Synthesis of Graft Polyolefins

Grafted polyolefins suitable for use in the compositions disclosed herein are manufactured by reacting polyolefins with unsaturated monomers at elevated temperatures, with or without a free-radical initiator, under conditions effective to graft unsaturated monomer units onto the polyolefin backbone.

Polyolefins suitable for making the grafted polyolefins include high density polyethylenes (HDPE), medium density polyethylenes (MDPE), low density polyethylenes (LDPE), linear low density polyethylenes (LLDPE), polypropylenes, ethylene-propylene copolymers, impact-modified polypropylenes, and the like, and blends thereof. The polyolefins may be homopolymers or include C4 to C10 comonomer α-olefins. The preferred polyolefin for making the grafted polyolefin is HDPE.

An unsaturated monomer reacts with the polyolefin to produce the grafted polyolefin. Suitable unsaturated monomers are well known. Unsaturated monomers can include ethylenically unsaturated carboxylic acids and acid derivatives, particularly esters, anhydrides, acid salts, and the like. Examples include acrylic acid, methacrylic acid, maleic acid, fumaric acid, itaconic acid, citraconic acid, maleic anhydride, tetrahydrophthalic anhydride, norborn-5-ene-2,3-dicarboxylic acid anhydride, nadic anhydride, himic anhydride, and the like, and mixtures thereof. Maleic anhydride is particularly preferred. Other suitable unsaturated monomers are described in U.S. Pat. Appl. Publ. Nos. 2004/0097637 and 2007/0054142, the teachings of which are incorporated herein by reference.

The relative amounts of unsaturated monomer and polyolefin used will vary and depend on factors such as the nature of the polyolefin and unsaturated monomer, reaction conditions, available equipment, and other factors. In some embodiments, the unsaturated monomer is charged in an amount within the range of 0.1 to 15 wt. %, preferably from 0.5 to 6 wt. %, and most preferably from 1 to 3 wt. %, based on the amount of grafted polyolefin produced. As the efficiency of the reaction varies, preferably, at least 80 wt. %, more preferably at least 85 wt. %, more preferably at least 90 wt. %, and most preferably at least 98 wt. %, of the unsaturated monomer is incorporated into the graft composition.

The amount incorporated can be measured by wet chemical methods (titration, etc.) or more preferably by Fourier transform infrared spectroscopy (FTIR) according to methods that are well known in the art.

Grafting is accomplished according to known procedures, generally by heating a mixture of the polyolefin and unsaturated monomer(s). Most typically, the grafted polyolefin is prepared by melt blending the polyolefin with the unsaturated monomer in a shear-imparting extruder/reactor Twin screw extruders such as those marketed by Coperion under the designations ZSK-53, ZSK-83, ZSK-90 and ZSK-92 are especially useful for performing the grafting step. A free-radical initiator such as an organic peroxide can be employed but is not necessary.

Grafting of the unsaturated monomer and polyolefin to generate the grafted polyolefin is performed at elevated temperatures, preferably within the range of 180° C. to 400° C., more preferably from 200° C. to 375° C., and most preferably from 230° C. to 350° C. Shear rates in the extruder can vary over a wide range, preferably from 30 to 1000 rpm, more preferably from 100 to 600 rpm, and most preferably from 200 to 400 rpm.

In the preferred embodiment, the grafted polyolefin is a maleated HDPE. Suitable HDPE for making maleated HDPE includes ethylene homopolymers and copolymers of ethylene and α-olefins. Suitable α-olefins include 1-butene, 1-hexene, and 1-octene, the like, and mixtures thereof. In some embodiments, the HDPE comprises less than 5 wt % of the α-olefins.

Preferably, the maleated HDPE contains from about 0.05 wt % to about 5 wt % of grafted maleic anhydride. More preferably, the maleated HDPE contains from about 0.5 wt % to about 2.5 wt % of grafted maleic anhydride. The density of HDPE is preferably from about 0.93 to about 0.97 g/cm$^3$ and more preferably from about 0.95 to about 0.965 g/cm$^3$ according to ASTM-D 1505. The HLMI of the HDPE is preferably in the range of from 1 to 10 g/10 min, preferably from 2.5 to 6 g/10 min. For the purposes of this invention as is well known to the skilled person, the expression "HLMI" means "high load melt index" and is determined at 190° C. under a load of 21.6 kg (190° C./21.6 kg) according to ASTM-D 1238. Additionally, the melt index (MI) of the maleated HDPE is within the range of 0.5 and 12 g/10 min, more preferably from 2 to 10 g/10 min, and still more preferably from 4 to 8 g/10 min. Throughout the present description and claims, MI is measured according to ASTM-D 1238, using a piston load of 2.16 kg and temperature of 190° C.

III. Synthesis of Tie-Layer Adhesive Composition

Exemplary tie-layer adhesive compositions can comprise a hybrid polyolefin produced with the use of a hybrid catalyst system herein disclosed and a graft polyolefin herein disclosed. In an exemplary, polymer adhesive composition comprises a hybrid PE produced with the use of a hybrid catalyst system and a graft HDPE.

The amount of hybrid polyolefin and grafted polyolefin used to prepare the polymer adhesive composition depends on the nature of the hybrid polyolefin and grafted polyolefin, the desired tie-layer properties, reaction conditions, equipment, and other factors. The mixture can be compounded in an extruder at a temperature of 200-240° C. and shear of 210-250 rpm to produce a polymer adhesive composition that can be used in a multi-layer film composition or tie-layer adhesive composition.

In some embodiments, the tie-layer adhesive comprises from 2 to 30 wt. %, preferably from 5-25%, preferably from 5%-15%, more preferably from 5-12%, more preferably from 5-10% of a graft olefin, and 70-98 wt. %, preferably 75-95 wt. %, more preferably from 85-95 wt. %, more preferably from 90-95 wt. % of the hybrid PE as the base resin.

The tie layer composition can be formed through dry or melt blending. Preferably the tie layer composition is formed using a so-called "in-line" process. In this process, a maleated polyolefin is blended with a hybrid PE reactor powder from the hybrid PE polymerization line before pelletization.

Tie-layer adhesives of the invention can be used in numerous multilayer barrier film constructions, including structures having five, seven, nine, or more layers. Illustrative multi-layer constructions include the following where "FCL" represents a food contact layer such as LDPE, LLDPE, EVA, ethylene-acrylic acid or ester copolymer, ethylene-methacrylic acid or ester copolymer, ionomers or the like:

HDPE/adhesive/EVOH/adhesive/HDPE
HDPE/adhesive/polyamide/adhesive/HDPE
EVOH/adhesive/HDPE/adhesive/EVOH
LDPE/adhesive/polyamide/adhesive/FCL
LDPE/adhesive/EVOH/adhesive/FCL
LLDPE/adhesive/EVOH/adhesive/FCL
LLDPE/adhesive/polyamide/adhesive/FCL
HDPE/adhesive/EVOH/adhesive/FCL
HDPE/adhesive/polyamide/adhesive/FCL Some commonly used sealable film constructions include:

LLDPE/adhesive/EVOH/adhesive/sealant
HDPE/adhesive/polyamide/adhesive/sealant
HDPE/adhesive/EVOH/adhesive/sealant where the sealant layer is, for example, EVA, LLDPE or ionomer.

The multilayer film of the invention can be made by a variety of processes. The multilayer film can be made by co-extrusion, coating, and other laminating processes. The film can be made by casting, blown film, or double/triple-bubble orientation processes. Blown film processes include high-stalk and in-pocket processes. In a high-stalk process, the extrudate exits the annular opening in the die in the form of a tubular "stalk" that is inflated a distance (usually the length of the stalk) from the extrusion die. For an in-pocket blown process, the tube is inflated as the tube exits the extrusion die. After the tube is flattened and cooled, it can be slit to form a film.

In some embodiments, the adhesive polymer composition can be fed or passed through an extruder to facilitate application of the adhesive polymer composition on a substrate. The adhesive polymer composition can be applied to the substrate as an extruded film or as a blown film. The substrate can be a moving flat substrate of paper, paperboard, metal foil or plastic film. After application of the adhesive polymer composition onto the substrate, the substrate can be passed between a set of counter-rotating rollers that press the polymer adhesive composition onto the substrate to ensure complete contact and adhesion. In an exemplary embodiment, the adhesive polymer composition has a thickness within the range of 0.5 to 12 microns.

The substrate can be a film sheet, paper, cardboard, paperboard, plastic film, metalized film, metal foil or an article. The metal foil can be any suitable metal including, but not limited to iron, steel, copper and aluminum.

In addition to the hybrid olefin and graft olefin, the tie layer adhesive composition can include other commonly used components, including adhesion promoters, elastomeric polymers, UV inhibitors, antioxidants, thermal stabilizers, and the like. For some examples of these, see U.S. Pat. Appl. Publ. No. 2004/0097637, the teachings of which are incorporated herein by reference.

EXAMPLES

The following examples are provided for illustrative purposes. The examples are not intended to limit the scope of the present disclosure and they should not be so interpreted.

Example 1

Synthesis of Hybrid Catalyst System and Hybrid Polyolefin a) Preparation of Support System XPO-2107, a spray-dried silica gel from Grace, was calcinated at 600° C. for 6 hours and subsequently 252.2 g of the dired silica gel admixed with 164.5 ml methylaluminoxane (MOA) (4.75 M in toluol, 0.79 mol). The mixture was stirred for one hour, filtered, the solid was washed with toluene and then dried under reduced pressure.

b) Preparation of Exemplary Hybrid Catalyst System

A mixture of 1.48 g (2.45 mmol) of 2,6-Bis[1-(4,6-Dimethyl-2-chloro-phenylimino) ethyl]pyridine iron(II)dichloride, 3.61 g (7.34 mmol) of bis(n-butylcyclopentadienyl) hafnium dichloride and 159.6 ml of MAO (4.75 M in toluene, 0.76 mol) was stirred at room temperature for 1 hour and subsequently added while stirring to a suspension of 237.1 g of the pretreated support material a) in 800 ml of toluene. The mixture was stirred at room temperature for a further 3 hours, the resulting solid filtered off and washed with toluene. The solid was dried under reduced pressure until it was free-flowing. This example produced 256.7 g of a hybrid catalyst system.

c) Preparation of Exemplary Hybrid PE

The hybrid catalyst system described above can be used to synthesize PE in ethylene copolymerization reactions using a fluidized-bed reactor having a diameter of 0.5 m. The reaction temperature was in the range of 94-105° C., the output was in the range of 3.1 to 3.8 kg/h. Ethylene was dosed at 3-5 kg/h and 1-hexene was dosed at 50 to 100 g/h. Hydrogen gas was metered at 0.5 to 1.5 l/h. The pressure of the reactor was maintained at 20 bar and 0.1 g of triisobutylaluminum per hour was metered throughout the polymerization. The copolymerization was conducted and terminated to produce a hybrid PE. The hybrid PE was pelletized. The properties of the PE produced in this Example 1 are provided in Table 1.

TABLE 1

| LLDPE Properties of Example 1 | | | |
|---|---|---|---|
| Property | Value | Units | ASTM Test Method |
| Melt Index (190° C./2.16 kg) | 2.49 | g/10 min | D 1238 |
| Density | 0.936 | g/cc | D 1505 |
| Mw | 95693 | g/mol | |
| Mw/Mn | 8.9 | | |
| Mz | 280975 | | |
| —HC═CH$_2$ | 1.08 | 1/1000 C | |
| >C═CH$_2$ | 0.25 | 1/1000 C | |
| Total-CH$_3$ | 10.6 | 1/1000 C | |
| % (w/w) Hexene | 5.6 | % | |
| High Load Melt Index (190° C./21.6 kg) | 85 | g/10 min | D 1238 |
| Intrinsic Viscosity η | 1.66 | dl/g | |
| CDBI | 29 | % | |

Comparative Example 2

Comparative LLDPE

In this comparative example, a Petrothene® GA501-020 series LLDPE was obtained. Petrothene® GA501-020 LLDPE is an ethylene-butene copolymer produced by Equistar Chemical Company and prepared with the use of a Ziegler-Natta catalyst. The properties of comparative Petrothene® GA501-020 LLDPE are provided in Table 2 below.

TABLE 2

| Properties of Petrothene ® GA501-020 LLDPE | | | |
|---|---|---|---|
| Property | Value | Units | ASTM Test Method |
| Melt Index (190° C./2.16 kg) | 1.0 | g/10 min | D 1238 |
| Density | 0.918 | g/cc | D 1505 |
| Vicat Softening Point | 107 | °C. | D 1525 |
| Film | | | |
| Gauge | 1.0 | mil | |
| Blow-up Ratio | 2.5:1 | | |
| Haze | 20 | % | D 1003 |
| Gloss, 45° | 40 | | D 523 |
| Dart Drop Impact Strength, F$_{50}$ | 100 | g | D 1709/A |
| Tensile Strength @ Break, MD (TD) | 6,600 (4,700) | psi | D 882 |
| Elongation @ Break, MD (TD) | 580 (725) | % | D 882 |
| 1% Secant Modulus, MD (TD) | 27,000 (28,000) | psi | D 638 |
| Elmendorf Tear, MD (TD) | 125 (330) | G | D 1922 |

The molecular weight distribution of GA501-020 LLDPE obtained using 3D-GPC is provided in FIG. 1.

The branching of GA501-020 obtained with the use of NMR was 19.3 branches of Et Br/1000 C, 0.7 branches of Bu Br/1000 C, and 0.8 branches of Saturated Ends/1000 C.

NMR samples were placed in tubes under inert gas and, if appropriate, melted. The solvent signals served as internal standard in the $^1$H and $^{13}$C-NMR spectra and their chemical shift was converted into the values relative to TMS.

The vinyl group content is determined by means of IR in accordance with ASTM D 6248 98.

The branches/1000 carbon atoms are determined by means of $^{13}$C NMR, as described by James. C. Randall, JMS-REV. Macromol. Chem. Phys., C29 (2&3), 201-317 (1989), and are based on the total content of $CH_3$ groups/1000 carbon atoms. The side chains larger than $CH_3$ and especially ethyl, butyl and hexyl side chain branches/1000 carbon atoms are likewise determined in this way. The degree of branching in the individual polymer mass fractions is determined by the method of Holtrup (W. Holtrup, Makromol. Chem. 178, 2335 (1977)) coupled with $^{13}$C NMR.-$^{13}$C-NMR high temperature spectra of polymer were acquired on a Bruker DPX-400 spectrometer operating at 100.61 MHz in the Fourier transform mode at 120° C.

The peak $S_{\delta\delta}$ [C. J. Carman, R. A. Harrington and C. E. Wilkes, Macromolecules, 10, 3, 536 (1977)]carbon was used as internal reference at 29.9 ppm. The samples were dissolved in 1,1,2,2-tetrachloroethane-d2 at 120° C. with a 8% wt/v concentration. Each spectrum was acquired with a 90° pulse, 15 seconds of delay between pulses and CPD (WALTZ 16) to remove $^1$H-$^{13}$C coupling. About 1500-2000 transients were stored in 32K data points using a spectral window of 6000 or 9000 Hz. The assignments of the spectra, were made referring to Kakugo [M. Kakugo, Y. Naito, K. Mizunuma and T. Miyatake, Macromolecules, 15, 4, 1150, (1982)] and J. C. Randal, Macromol. Chem. Phys., C29, 201 (1989).

The density [g/cm$^3$] was determined in accordance with ISO 1183.

The determination of the molar mass distributions and the means Mn, Mw, Mz and Mw/Mn derived therefrom was carried out by high-temperature gel permeation chromatography using a method described in DIN 55672-1:1995-02 issue February 1995. The deviations according to the mentioned DIN standard are as follows: Solvent 1,2,4-trichlorobenzene (TCB), temperature of apparatus and solutions 135° C. and as concentration detector a PolymerChar (Valencia, Paterna 46980, Spain) IR-4 infrared detector, capable for use with TCB.

A WATERS Alliance 2000 equipped with the following precolumn SHODEX UT-G and separation columns SHODEX UT 806 M (3×) and SHODEX UT 807 connected in series was used. The solvent was vacuum distilled under nitrogen and was stabilized with 0.025% by weight of 2,6-di-tert-butyl-4-methylphenol. The flow rate used was 1 ml/min, the injection was 500 µl and polymer concentration was in the range of 0.01%<conc.<0.05% w/w. The molecular weight calibration was established by using monodisperse polystyrene (PS) standards from Polymer Laboratories (now Varian, Inc., Essex Road, Church Stretton, Shropshire, SY6 6AX, UK) in the range from 580 g/mol up to 11600000 g/mol and additionally Hexadecane. The calibration curve was then adapted to Polyethylene (PE) by means of the Universal Calibration method (Benoit H., Rempp P. and Grubisic Z., & in J. Polymer Sci., Phys. Ed., 5, 753 (1967)). The Mark-Houwing parameters used herefore were for PS: $k_{PS}$=0.000121 dl/g, $\alpha_{PS}$=0.706 and for PE $k_{PE}$=0.000406 dl/g, $\alpha_{PE}$=0.725, valid in TCB at 135° C. Data recording, calibration and calculation was carried out using NTGPC_Control_V6.02.03 and NTG-PC_V6.4.24 (hs GmbH, Hauptstraße 36, D-55437 Ober-Hilbersheim) respectively.

Example 3

Synthesis of Exemplary Graft HDPE

A graft HDPE is prepared by grafting maleic anhydride (2.0 wt. %) onto high density polyethylene (density: 0.957 g/cm3; HLMI=3 g/10 min). The high-density polyethylene and maleic anhydride are fed to a first Coperion ZSK-92 twin-screw extruder having zones heated at temperatures ranging from 230 to 350° C. and operated at shear rates within the range of 200 to 400 rpm to produce a maleic anhydride grafted HDPE. The resulting graft HDPE product is cooled and pelletized.

By FTIR, the graft HDPE contains 1.6 wt. % of grafted maleic anhydride, which corresponds to about 80% grafting efficiency. Additional similar preparations of grafted HDPE with 2.0 wt. % charged maleic anhydride produce grafted HDPE having 1.6 to 1.7 wt. % grafted maleic anhydride, which corresponds to 80-85% grafting efficiency.

Example 4

Synthesis of Exemplary Polymer Adhesive Composition 1

Pelletized PE from Example 1 can be dry blended with graft HDPE from Example 3 and antioxidants Irganox 1010 (0.1 wt. %) and Irgafos 168 (0.1 wt. %). The dry blended mixture is melted and compounded in an extruder at a temperature of 200-240° C. and shear of 210-250 rpm to produce a polymer adhesive composition that can be used in a multi-layer film composition or tie-layer adhesive composition. The exemplary adhesive composition is pelletized and comprises 8.5 wt. % graft HDPE and 91.3 wt. % hybrid PE.

Comparative Example 5

Synthesis of Comparative Polymer Adhesive Composition 2

Pelletized LLDPE (density=0.918 g/cc; Melt Index=1 g/10 min) from Comparative Example 2 can be dry blended with graft HDPE from Example 3 and antioxidants Irganox 1010 (0.1 wt. %) and Irgafos 168 (0.1 wt. %). The blended dry mixture is melted and compounded in an extruder at a temperature of 200-240° C. and shear of 210-250 rpm to produce a comparative polymer adhesive composition that can be used in a multi-layer film composition or tie-layer adhesive composition. The exemplary polymer adhesive composition is pelletized and comprises 8.5 wt. % graft HDPE and 91.3 wt. % of comparative LLDPE.

Adhesion Test Results

The compositions of Example 4 and Comparative Example 5 were used as tie-layers and tested in a five-layer film. Films were produced using polymer adhesive compositions of Example 4 and Comparative Example 5. Each film was made with a Killion extruder by co-extruding HDPE, Ethylene-vinyl alcohol copolymer (EVOH) and a tie-layer of either composition 1 (Example 4) or composition 2 (Comparative Example 5). Ethylene-vinyl alcohol copolymer (EVOH) is Soarnol® DC3203 FB grade, product of Nippon Gohsei Kagaku K.K., Japan. A five-layer film of HDPE/tie layer/EVOH/tie layer/HDPE was produced using each tie-layer composition 1 and composition 2. The layer distribution is 43 wt. % HDPE, 4 wt. % tie layer, 6 wt. % EVOH, 4 wt. % tie layer, and 43 wt. % HDPE, respectively. Film samples were tested for adhesion according to ASTM D1876 1-day after they were produced. The force required to separate the film apart in a T-peel configuration at 25.4 mm (10 inches)/min is measured using an Instron® tensile tester. The average adhesion for each specimen was recorded as the peel strength in lb/in for 1-inch wide samples of 3 mil and 5 mil thick samples after adhering for 1-day. The composition of each tie-layer composition tested is provided in Table 3 and adhesion values are reported in Table 4.

TABLE 3

Composition of Polymer Adhesive Composition

| Component | Exemplary Composition 1 | Comparative Composition 2 |
|---|---|---|
| Example 3 | 8.5% | 8.5% |
| Example 1 | 91.3% | 0% |
| GA501-020 | 0% | 91.3% |
| Irgafos 168 | 0.1% | 0.1% |
| Irganox 1010 | 0.1% | 0.1% |

TABLE 4

Adhesion Results

| Composition | Adhesion (3 mil and 1-day) | Adhesion (5 mil and 1-day) |
|---|---|---|
| Exemplary Composition 1 | 0.59 lb/in | 0.99 lb/in |
| Comparative Composition 2 | 0.32 lb/in | 0.47 lb/in |

It was unexpectedly discovered that adhesion is enhanced in tie-layer adhesive compositions comprising hybrid PE produced from a hybrid catalyst in combination with a graft HDPE polymer as compared to tie-layer adhesive compositions comprising traditional butene-based LLDPE produced with the use of non-modified Ziegler-Natta catalyst systems. It was also unexpectedly discovered that tie-layers comprising hybrid PE having higher molecular weight distributions, (for example above about 4.5), exhibit enhanced adhesion.

Example embodiments have been described hereinabove regarding improved systems, methods and compositions for the production of tie-layer adhesives. Various modifications to and departures from the disclosed example embodiments will occur to those having ordinary skill in the art. The subject matter that is intended to be within the spirit of this disclosure is set forth in the following claims.

What is claimed is:

1. An adhesive composition comprising:
   (A) 8.5 wt. % to 10 wt. %, based upon the total weight of the adhesive composition, of a grafted high-density polyethylene, comprising 0.05 wt. to 1.7 wt. %, based upon the total weight of the grafted high-density polyethylene, of maleic anhydride, having:
      (i) a density from 0.93 to 0.957 g/cm$^3$,
      (ii) a high load melt index of 1 to 10 g/10 min, and
      (iii) a melt index from 0.5 to 3 g/10 min; and
   (B) 90 wt. % to 91.3 wt. %, based upon the total weight of the adhesive composition, of a linear low density polyethylene having:
      (i) a density from 0.91 to 0.936 g/cm$^3$,
      (ii) a Mw/Mn from 5 to 8.9, and
      (iii) a melt index from 0.5 to 15 g/10 min; and
   wherein the linear low density polyethylene is produced by polymerizing ethylene in the presence of a hybrid catalyst comprising a mixture of at least two single-site catalysts.

2. The adhesive composition of claim 1, wherein the hybrid catalyst comprises bis(n-butylcyclopentadienyl)hafnium dichloride and 2,6-bis[1-(4,6-dimethyl-2-chloro-phenylimino) ethyl]pyridine iron (II) dichloride.

3. The adhesive composition of claim 1, wherein the molecular weight distribution of the linear low density polyethylene is from 7 to 8.9.

4. A process for preparing a composition for a tie layer of a multilayer structure comprising:
   combining
   (A) 8.5 % to 10 wt. %, based upon the total weight of the adhesive composition, of a grafted polyethylene, \wherein the grafted polyethylene is a high-density polyethylene comprising 0.05 wt. to 1.7 wt. %, based upon the total weight of the grafted polyethylene, of maleic anhydride, having:
      (i) a density from 0.93 to 0.957 g/cm$^3$,
      (ii) a high load melt index of 1 to 10 g/10 min, and
      (iii) a melt index from 0.5 to 3 g/10 min; and
   (B) 90 wt. % to 91.3 wt. %, based upon the total weight of the adhesive composition, of a linear low density polyethylene having;
      (i) a density from 0.91 to 0.936 g/cm$^3$,
      (ii) a Mw/Mn from 5 to 8.9, and
      (iii) a melt index from 0.5 to 15 g/10 min; and
   wherein the linear low density polyethylene is produced by polymerizing ethylene in the presence of a hybrid catalyst comprising a mixture of at least two single-site catalysts.

5. The process of claim 4, wherein the hybrid catalyst comprises bis(n-butylcyclopentadienyl)hafnium dichloride and 2,6-bis[1-(4,6-dimethyl-2-chloro-phenylimino) ethyl]pyridine iron (II) dichloride.

6. The process of claim 4, wherein the molecular weight distribution of the polyethylene is from 7 to 10.

7. A multilayer structure comprising a tie-layer consisting essentially of:
   (A) 8.5 wt. %, based upon the total weight of the adhesive composition, of a grafted high-density polyethylene comprising 0.05 wt. % to 1.7 wt. %, based upon the total weight of the grafted polyethylene, of maleic anhydride, having:
      (i) a density from 0.93 to 0.957 g/cm$^3$,
      (ii) a high load melt index of 1 to 10 g/10 min, and
      (iii) a melt index from 0.5 to 3 g/10 min; and
   (B) 90 wt. % to 91.3 wt. %, based upon the total weight of the adhesive composition, of a linear low density polyethylene having:
      (i) a density from 0.91 to 0.936 g/cm$^3$,
      (ii) a Mw/Mn from 5 to 8,9, and
      (iii) a melt index from 0.5 to 15 g/10 min; and
   wherein the linear low density polyethylene is produced by polymerizing ethylene in the presence of a hybrid catalyst comprising a mixture of at least two single-site catalysts.

* * * * *